United States Patent [19]

Theis

[11] Patent Number: 5,117,578

[45] Date of Patent: Jun. 2, 1992

[54] PLANT FIELD VACUUMING APPARATUS

[75] Inventor: Robert M. Theis, Phillips, Wis.

[73] Assignee: Industrial Air Products Inc., Phillips, Wis.

[21] Appl. No.: 542,516

[22] Filed: Jun. 22, 1990

[51] Int. Cl.$^5$ .................................. 43 139; A01M 5/08
[52] U.S. Cl. ..................................................... 43/140
[58] Field of Search ................... 43/140, 141, 138, 139

[56] References Cited

U.S. PATENT DOCUMENTS

| | | | |
|---|---|---|---|
| 1,582,744 | 4/1926 | Fratzke | 43/140 |
| 1,586,123 | 5/1926 | Sikorski | 43/140 |
| 1,849,425 | 3/1932 | Guerra | 43/140 |
| 2,201,463 | 5/1940 | Williams et al. | 43/140 |
| 2,643,482 | 6/1953 | Wilson | 43/140 |
| 2,722,082 | 11/1955 | Nisbet | 43/141 |
| 3,055,127 | 9/1962 | Williamson | 37/235 |
| 3,222,802 | 12/1965 | Kiernan | 37/236 |
| 4,683,673 | 8/1987 | Taylor | 43/139 |
| 4,825,582 | 5/1989 | Szynal | 43/140 |

OTHER PUBLICATIONS

Bug Vacuum Machine, "The Washington Times", Aug. 24, 1988, p. E8.

Primary Examiner—Kurt Rowan
Assistant Examiner—James Miner

[57] ABSTRACT

A vacuuming apparatus simultaneously vacuums a plurality of parallel rows of plants for removing of insects. A plurality of side-by-side vacuum units are mounted on a mobile support including a tractor-mounted lift to be releasably attached to the front of the tractor. Each vacuum unit includes at least two separate depending intake units located to span two adjacent plant rows. The mobile support includes a frame including a central lift assembly. A parallelogram lift linkage connects the tractor to the lift assembly for vertical positioning of the apparatus. Hydraulical power rams are connected to a tractor driven hydraulic source for control of the position of the apparatus from the tractor. The mobile support frame may include pivoted end frame members, each supporting a vacuum unit and a pair of vacuum inlets. The end frame members are pivoted up and over the ends of the frame for over-the-road travel of the vacuuming apparatus. Releasable support legs support the vacuuming apparatus on the ground when disconnected from the tractor.

4 Claims, 4 Drawing Sheets

PLANT FIELD VACUUMING APPARATUS

BACKGROUND OF THE INVENTION

This invention relates to a plant field vacuuming apparatus and particularly to such apparatus specially constructed for simultaneously vacuuming a plurality of laterally spaced parallel rows of vegetables and like plants.

In the growing of vegetables, insects are a constant reoccuring destroyer of the plant and/or vegetable itself. Various insecticides have been developed over the years to control and eliminate the problem with the insects and thus protect the plant and increase the productivity. The side effects associated with insecticides however are often significant. In recent years, various insecticides which have heretofore been used have been, in fact, withdrawn from the market because of adverse side effects, and others are being subjected to critical analysis and possible withdrawal. An alternate use to the insecticide is the use of some means to remove the insects physically from the area and particularly the plants. For example, U.S. Pat. No. 4,683,673 which issued Aug. 4, 1987 and U.S. Pat. No. 4,141,174 which issued Feb. 27, 1979 discloses a system whereby a plant structure is enclosed and the insect is removed through a vacuum system. In order to completely process a field, a continuous vacuum system which moves over the field is required in order to adapt the vacuum system to cost effective cleansing of the field of the adverse insects.

Although various systems have been proposed, there is a need for a simple, reliable and effective vacuuming system.

SUMMARY OF THE PRESENT INVENTION

The present invention is particularly directed to a motorized multiple row vacuuming system having an improved structure for simultaneously processing a plurality of parallel rows for removing of the insects from the plants. Generally, in accordance with the teaching of the present invention, a plurality of side-by-side mounted vacuuming units are mounted on a mobile support. The support includes a tractor-mounted lift adapted to be releasably attached to the front of the tractor for positioning relative to the parallel rows of a vegetable field. Each vacuuming unit is preferably constructed with at least two separate depending intake units located to span at least two plant rows of the field as the mobile support traverses the field. The multiple vacuuming units provide for a high effective and efficient vacuuming of all coupled rows with cost effective processing and cleansing of the plants. Vacuum units to simultaneously process more than one row are readily provided with present day technology and a plurality of such units can be readily interconnected to a mobile unit for processing a plant field by a tractor or selfcontained drive system.

In accordance with a further aspect of this invention, the fan units are mounted to a frame structure by a powered lift apparatus for accurate placement over the plant in combination with front tractor mount for control vacuuming of the field.

In a preferred and practical construction, a support frame unit is provided for a pair of fan units, each of which included a evase or pick-up unit overlying a pair of plant rows. The support frame includes an end mount permitting coupling of a pair of frames to cover eight rows. Each frame unit includes a central lift assembly, for raising and lowering the vacuuming apparatus. The lift assembly preferably provides for essentially linear vertical positioning of the apparatus and includes a parallelogram lift linkage unit with hydraulically powered links connected to the tractor mount structure.

The frame unit is preferably provided with separate releasable support legs for supporting of the vacuuming apparatus on the ground when connected and disconnected from the tractor.

The present invention has been found to provide a cost effective and efficient plant field vacuuming apparatus which can be operated with a minimum required skill level.

DESCRIPTION OF THE DRAWINGS

The drawings furnished herewith generally illustrate the best mode presently contemplated for the invention and is described hereinafter.

In the drawings.

DESCRIPTION OF THE ILLUSTRATED EMBODIMENT

Figure 1:
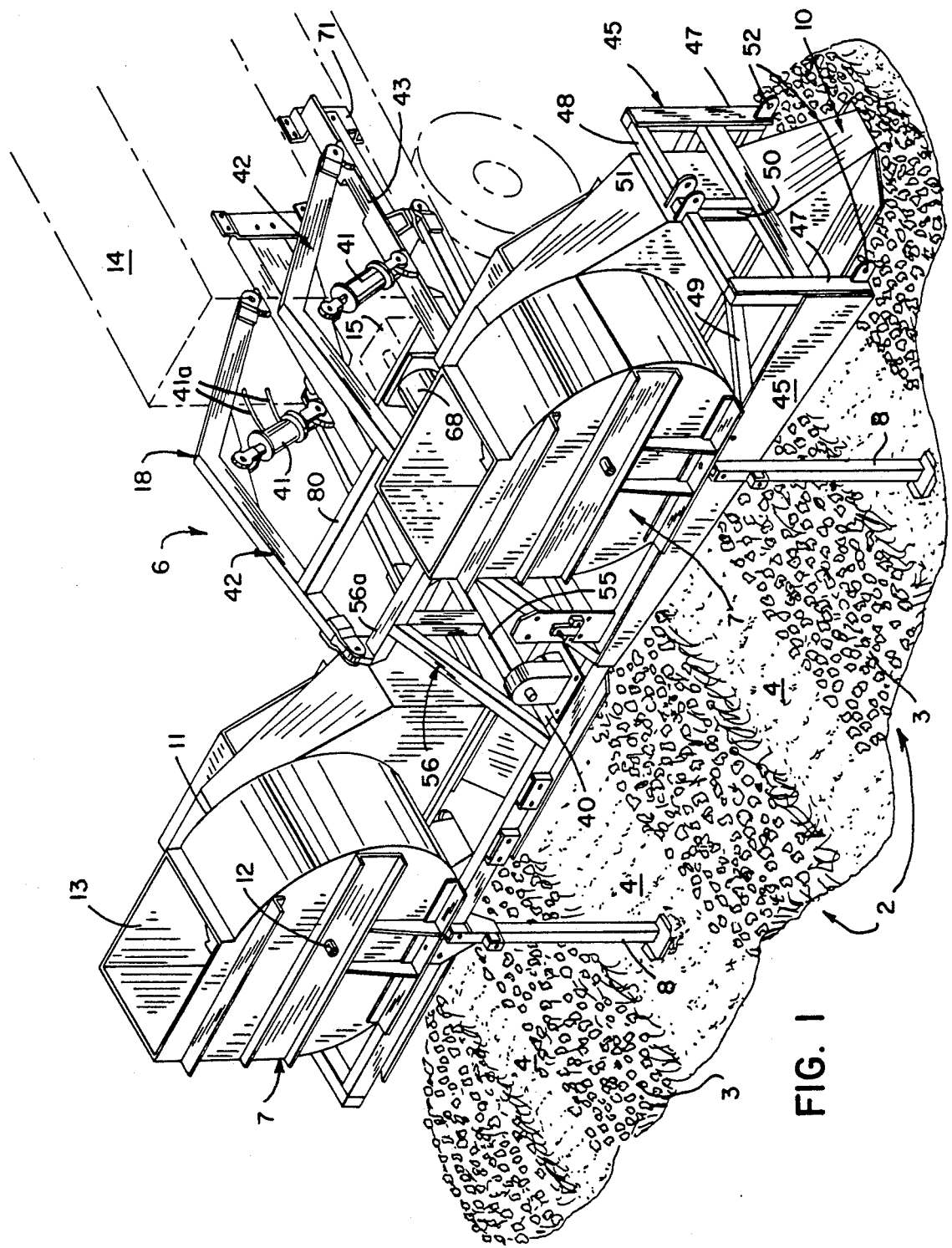
FIG. 1 is a simplified pictoral view of a four row vacuuming apparatus constructed in accordance with the teaching of the invention for processing of a vegetable field.
Figure 3:
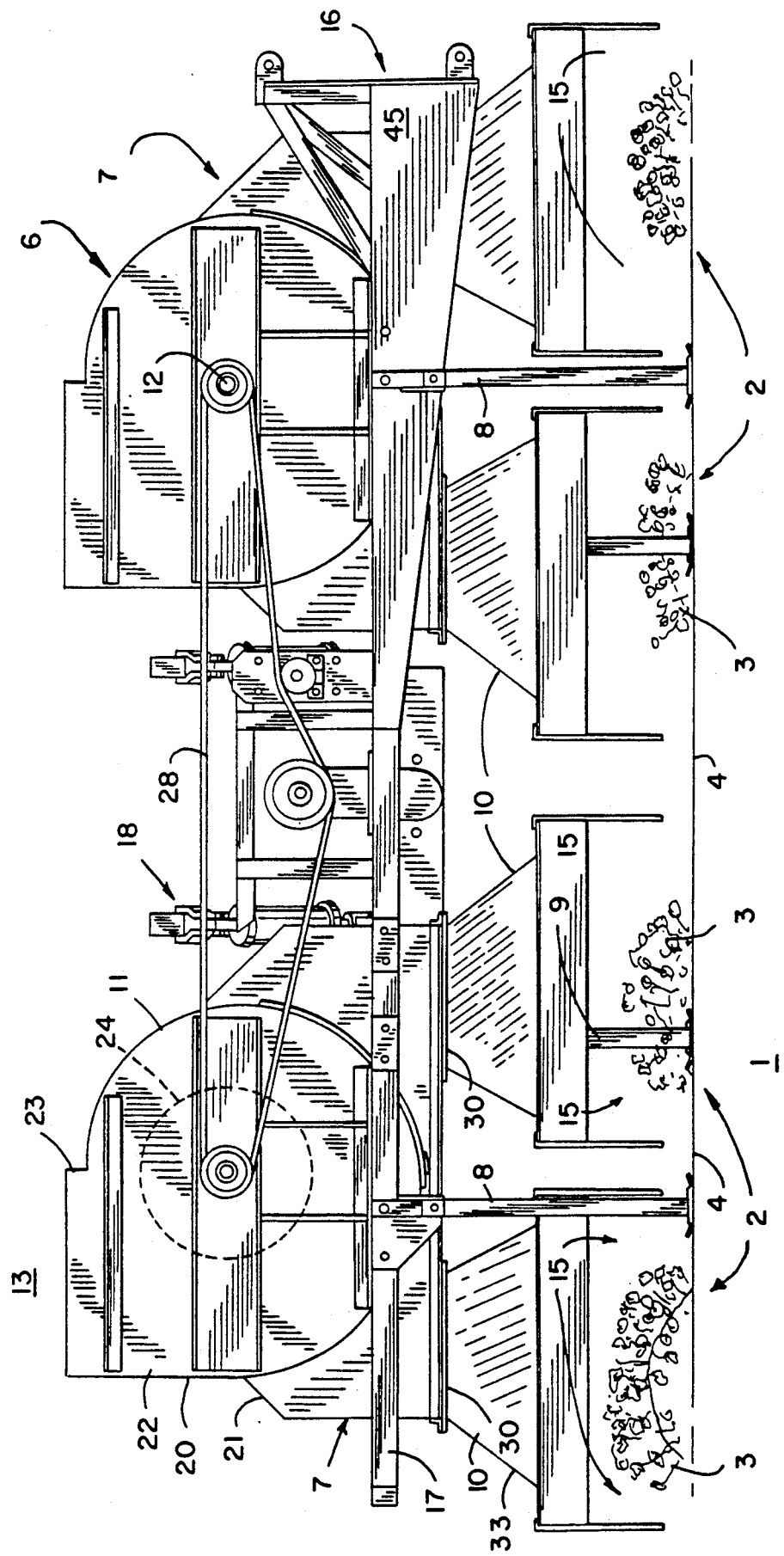
FIG. 3 is an enlarged front end view of the apparatus in FIG. 1.

Referring to the drawings and particularly to FIGS. 1 and 3, a vegetable field 1 is diagrammatically illustrated including a plurality of row 2 of vegetable plants 3. The rows 2 are evenly spaced and of essentially the same width and length. The plants 3 are of the same variety and grow to similar limited heights. The plants 3 are planted in rows of mounded earth, as shown, with a generally flat or level space 4 between the mounds. The plants are subject to damaging attach by insects, not shown. In accordance with this invention, a mobile vacuum apparatus 6 is mounted for movement along the rows 2 and span four rows. The apparatus 6 includes two lateral spaced vacuum units 7, each of which is similarly constructed to span two adjacent rows 2. The apparatus 6 is supported by front and rear legs 8 and 9 to support the apparatus in storage or the like. A pair of bottom evase or inlet units 10 are coupled to each fan unit 7 and located to move over the adjacent rows of plants 3 and may partially engage the uppermost extend of the plant leaves. A single fan unit 11 is coupled to the inlet units 10 and includes a power taken-off driven shaft 12 for creating a sufficient vacuum within the inlet units 10 to draw the insects 5 from the two rows of plants 3 and discharge them into a collection unit 13 for subsequent disposal.

In accordance with one feature of the present application, the apparatus 6 is mounted to the front of a powered vehicle such as a tractor 14, with a tractor take-off coupling 15 connected through a common drive unit to the several driven shafts 12 of the vacuum units 7. The shafts 12 are shown coupled by connecting a belt assembly or the like. Each fan unit 7 may alternatively have a hydraulic motor, not shown, connected to its shaft 12. The motors are coupled to a hydraulic pump operated by the tractor to provide a source of hydraulic fluid for operating the motors. The vacuum units 7 are thus driven simultaneously from the tractor, with the driving of the tractor 14 through the field to simultaneously vacuum the rows 2.

Two vacuum units 7 are fabricated with a main frame structure or unit 16. Generally, the frame structure 16 includes a rectangular frame 17 extended across the system to support the pair of vacuum units 7, with a pair of intake units depending from each fan unit 7 into close coupling to the plant rows. A lift assembly 18 is secured to the center of frame 17 and releasably secured to the tractor 14 for vertical positioning of the vacuum apparatus relative to the plants.

Each vacuum unit 7 includes a front centrifugal fan unit 20 and a rear suction chamber unit 21 secured to the back side of the fan unit 20. The fan unit 20 includes an outer cylindrical housing 22 with a spiral wall defining a top discharge passageway 23. The fan unit 20 has a central inlet opening 24 in the common wall 25 with the suction chamber 26. The fan blade 27 is mounted within the housing 22 with the shaft 12 journaled in the fan walls, as by bearing units 27. A belt drive 28 couples the shafts 12 to each other and to the tractor take-off. The fan unit 20 generates a low pressure in the vacuum chamber 21 and draws air upwardly over the plants 3 and through the vacuum chamber 21 and fan unit 7.

Each vacuum chamber 21 has a common rectangular flange bottom opening 30 spanning the two adjacent rows 2. An intermediate V-shape wall 31 in combination with outer inclined walls defines side-by-side upwardly converging air passageways into the common inlet to the centrifugal fan to provide a high velocity of air flow over the plants. Each inlet unit 10 is secured to a bottom flanged opening 30 connected to the common chamber 21.

Each pick-up unit 10 is a generally rectangular unit having outwardly diverging side walls 33 and downwardly converging front and back walls 34 to define a narrow bottom opening overlying the plant row 2. The vacuum chamber 21 and inlet units 10 have complementing rectangular frames 35 which are gasketed and bolted together to form an air tight coupling. Each fan unit 7 creates a significant high velocity air flow through the vacuum chamber 21 and the evase or intake units and thereby over the aligned plants 3 to draw the insects 5 from the plants 3 and discharging the insects into the waste chamber 13.

The frame 17 includes an end frame coupling 19, shown as apertured brackets to the coupling to a rear tractor lift for transport.

In operation, the apparatus 1 is mounted to the tractor 14 and raised from the ground. The tractor 14 is driven to align the vacuum units 7 with the vegetable rows 2 at one end of the field. The vacuum apparatus 1 is lowered to support the apparatus for traversing the field 1. The fan drive is engaged and the tractor 14 driven down the field to pass the vacuum opening over the aligned rows and thereby remove the insects from the vegetables.

Figure 2:
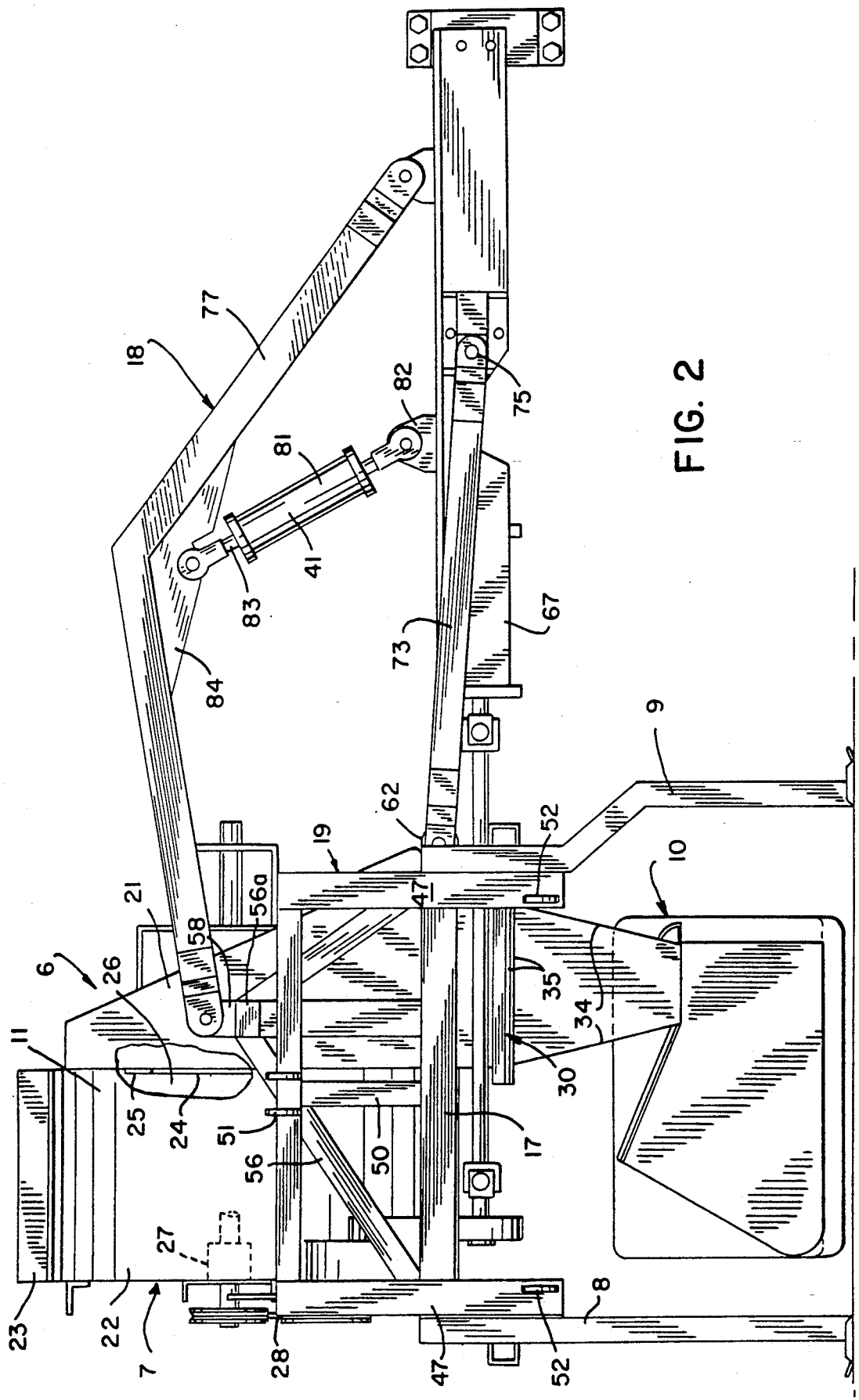
FIG. 2 is a side elevation view of the apparatus shown in FIG. 1 with the tractor removed.

More particularly in the illustrated embodiment, the supporting structure or frame 17 for each pair of fan units 11 is a generally rectangular support frame with vacuum units secured to the opposite half or end portions of the frame 17. With reference to FIGS. 2 and 5, a lift support framework 40 is secured generally intermediate the length of the frame 17 and provides for pivotal interconnection of the lift assembly 18 which interconnects the frame unit to the tractor.

The lift assembly 18 is provided with a pair of similar hydraulic ram units 41 located to the opposite sides of the lift assembly 18 and coupled via lines 41a to a hydraulic supply from the tractor 14. The hydraulic ram units 41 are connected to pivot arms 42 of the lift assembly and a tractor mount frame 43 secured to the frame 17. As more fully developed hereinafter, the lift assembly 18 and particularly the pivot arms 42 thereon are formed as a part of a parallelogram structure for lifting of the interconnected vacuum units 7 in a vertical orientation.

The main support structure or frame 17 is provided with appropriate supporting legs 8 and 9 for supporting of the vacuuming apparatus raised above the ground level to support the assembly when not in use and to provide a guide support as the unit is moved over the field.

Figure 4:
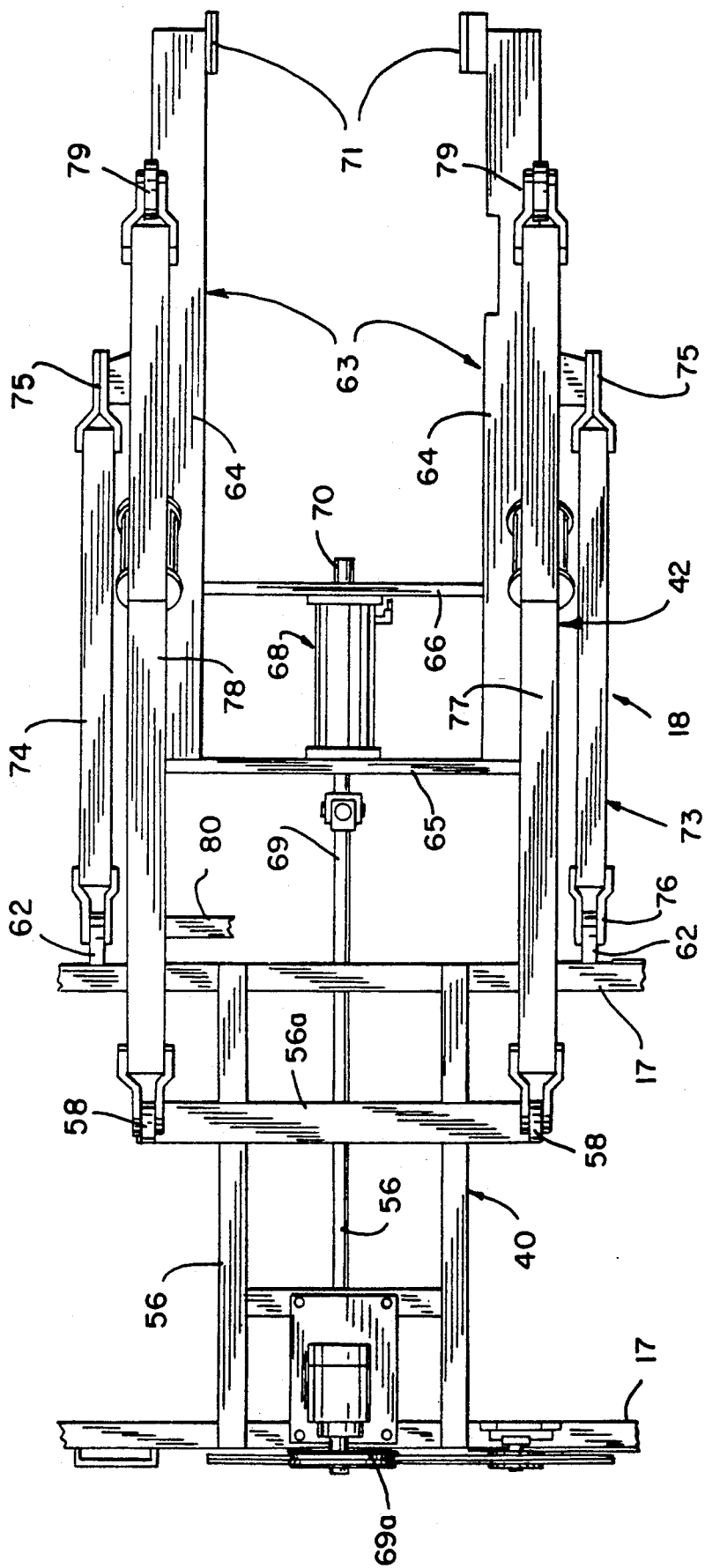
FIG. 4 is a top view of the tractor coupling apparatus of FIG. 1.

Referring to the drawings and particularly to FIGS. 2–4, the support frame 17 of unit 16 and particularly the outer rectangular frame 17 formed of a box channel member welded together to form a support structure having a length generally equal to the length of the two fan units and the four intake or evase units 10 connected to the two fan units 7. Front and back gusset plates 45 are secured to the one end portion of the frame adjacent the coupling frame for connecting of two frames to each other. The gussetts 45 extend slightly less than half the length of the main frame and extend downwardly of the frame 17 and strengthen the coupling.

The end coupling frame 19 for coupling to a tractor for transport is shown in FIGS. 2 and 4 as a generally inverted U-shaped member having L-shaped channel posts 47 at the outer end of the rectangular frame 17. The posts 47 project upwardly and downwardly of the main frame and are welded in place including the interconnection to the gusset plates 45. A cross brace 48 and angled braces 49 extend between the top end of the posts and the aligned side member of the main frame. A central vertical post 50 is interconnected between the top cross bar of the U-shaped frame and the end member of the main frame 17. Pivot plates or brackets 51 are welded to the top brace of the U-shaped frame and project outwardly from the side of such top member. Similar brackets 52 are welded to the lower end of the posts 47 projecting forwardly with brackets 51.

The central portion of the support frame 17 includes the lift assembly 18. Referring to FIGS. 2, 3 and 5, a lift frame 40 is secured as a part of the main frame 17 and includes similar side assemblies 54 spanning the frame and interconnected to and forming an integral part of the main frame 17. Thus, each of the side assembly 54 is generally a triangular frame work having a base beams 55 extended between the sides of the main frame and an upstanding triangular side members 56 projecting upwardly to an apex point somewhat toward the rear of the main frame, with strengthening brace connecting the apex to the main frame. A pivot cross beam 56a is secured to the apex and projects outwardly of the two side members 56 longitudinally of the main frame 17 for a short distance. Standing and apertured pivot brackets 58 are welded to the outer top ends of the pivot cross beam 56a. In addition, the rear frame member of the main frame 17 is provided with a pair of apertured pivot brackets 62 which are welded to the longitudinal frame member and projects rearwardly therefrom.

Referring particularly to FIGS. 2-4, the lift frame assembly 18 includes a generally U-shaped support or base frame 63 including a pair of L-shaped angle side members 64 joined at the forward end by an apertured cross plate 65, as shown in FIG. 5. The members 64 are further interconnected by a second cross plate 66 located inwardly a short distance from the end plate and extend between a pair of depending frame plates 67 of the members 64. A drive coupling 68 is supported between plates 65 and 66 with a universal drive shaft 69 connected between coupling 68 and the common drive pulley 69a on the front of main frame 17. The drive coupling 68 includes an input shaft 70 connected to the tractor or powet take-off 15 in the assemblied relation.

The open end of the U-shaped mounting unit is provided with vertically extended mount plates or brackets 71 which have inwardly offset aperature flanges for rigid interconnecting to the side frame of the tractor, as shown in phantom in FIG. 2, to fix the vacuum apparatus to the tractor structure. A first set of pivot arms 73 and 74 are similarly pivotally secured to the opposite sides of the frame member 64 of the assembly 18, as follows. Referring to the arm 73, the outer end of the arm has an apertured bracket which is pivotally mounted on a pin secured to the underside of the L-shaped side members 64, as at 75. The arm 73 projects forwardly with the outer end formed with a bifurcated pivot unit 76 aligned with and pinned to the pivot brackets 62 secured to the frame 17. In addition, the lift assembly includes a pair of generally V-shaped arms 77 and 78 which are similarly pivotally secured to the outer ends of the side members 64 of assembly 18. Referring to arm 77, the arm is pivoted to the side member 64 adjacent the tractor mounting brackets 71 as at 79. The V-shaped arm 77 extends upwardly and outwardly over the frame 64 with the outermost end terminating in a bifurcated pivot bracket pinned to the top pivot bracket 58 of the triangular side member 56. Arm 78 is similarly mounted to the opposite side of assembly 18 and the arms 77 and 78 are joined forwardly of the pivot brackets by a cross arm 80.

Hydraulic ram units are secured to each arm 77 and 78. Referring to the unit coupled to arm 77, a cylinder 81 has its closed end pivotally interconnected to a pivot bracket 82 on the U-shaped frame, generally rearwardly of the apex of the V-shaped arm 77. A piston rod 83 extends upwardly and forwardly to the apex and is pivotally interconnected to a bracket 84 in the underside of the apex of the arm 77 generally in alignment with the apex. The hydraulic ram units 41 are interconnected to a common power pressurized hydraulic source from the tractor for extending the hydraulic ram unit and collapsing thereof. In the extended position, the lift arms move upwardly, with the pivot arms following a vertical path as a result of the parallelogram orientation and lifting motion of the arms. As the result, the main frame moves vertically upwardly with a very slight accurate movement but with the vacuum apparatus located in a vertical orientation.

With the ram unit collapsed, the arms pivot downwardly and lowers the vacuum apparatus to ground level for movement over the field and plants, as previously discussed.

The embodiment of FIGS. 1-4 illustrates a four row vacuum apparatus providing a practical system and of a width for convenient transport. An apparatus for simultaneous vacuuming of lesser or greater number of rows may be provided. For example, an eight row vacuum apparatus using the dual evase units per fan unit has also been constructed for commercial vacuuming of vegetable fields and the like. In such apparatus, end fan units are provided with separate frames pivotally attached to the adjacent central dual fan unit. The end units are fixed in the extended aligned position with the central unit for movement over the field. The end units which have arms pivoted to adjacent fan unit, such as the axis of the fan unit, are folded upwardly over the center unit for transport between fields and over the road movement.

The present inventor has found the front mounted vacuum apparatus and particularly the multiple evase per fan unit provides a practical and particularly cost efficient plant vacuuming apparatus.

Various modes of carrying out the invention are contemplated as being within the scope of the following claims and distinctly claiming the subject matter which is regarded as the invention.

I claim:

1. A vacuum apparatus for vacuuming a growing field of low level plants planted in parallel extended row for connection to the front of a field tractor, comprising a frame structure adapted to project laterally into overlying engagement with a plurality of said rows, first and second centrifugal fan units mounted on said frame, suction chambers mounted to the rear of each of said fan units, each of said fan units including a housing having an upper discharge passageway, and having an inlet opening in the rear wall of said housing and a centrifugal fan wheel within said housing and with a rotary drive shaft extended forwardly from the housing, a drive coupling interconnecting said shafts of said fan units to a common drive member, and said tractor having a front power-take-off driven member adapted to be coupled to said common drive member for rotation of said fan units, said fan units adapted to draw air upwardly through the suction chambers and discharge into said discharge passageway, two evase units coupled to the lower end of each of said suction chambers and projecting downwardly therefrom toward ground level with a bottom opening and having only said two evase units connected to each suction unit, said evase units being laterally spaced on said frame structure in accordance with the lateral spacing of said plant rows, an automated lift unit connected to one side of said frame generally centrally thereof, a tractor support secured to said lift unit and adapted to be secured to a tractor for positioning of said fan units for vacuuming of the plants, wherein said lift unit projects to the back side of said frame for attachment to the front of said tractor and thereby locating said vacuum units in front of said tractor whereby said vacuum apparatus is moved forwardly of the tractor over said plant units.

2. The apparatus of claim 1 wherein said frame structure includes a generally rectangular frame having said fan units secured to the top of said frame structure and said evase units located beneath said frame structure, said lift unit including a lift support structure secured to the central portion of said frame and including a top pivot unit and a rear pivot unit aligned with said central portion, said lift unit including a lift frame assembly mounted for rigid affixation to said tractor and including lower and upper pivot arms pivotally secured to said pivot units and defining a parallelogram support of said lift frame assembly, hydraulic ram units interconnected between said lift arms and said lift support structure operable to pivot the lift arms for raising and lowering of said frame structure and thereby said fan units relative to the ground level.

3. The apparatus of claim 2 including a plurality of spaced front and rear leg members secured to said frame structure and projecting downwardly below said evase units and defining a ground support for supporting of said apparatus.

4. The apparatus of claim 1 wherein said evase units include separating vertical sides plates located between adjacent evase units and at the outer end of the outer evase units to define separate forwardly and rearwardly opened channel portions extended downwardly from the lower end of the evase units to encompass said plants within the aligned evase unit.

* * * * *